US006713908B1

(12) United States Patent
Tai et al.

(10) Patent No.: US 6,713,908 B1
(45) Date of Patent: Mar. 30, 2004

(54) USING A MICROMACHINED MAGNETOSTATIC RELAY IN COMMUTATING A DC MOTOR

(75) Inventors: Yu-Chong Tai, Pasadena, CA (US); John A. Wright, Pasadena, CA (US); Gerald Lilienthal, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/281,831

(22) Filed: Mar. 30, 1999

Related U.S. Application Data

(60) Provisional application No. 60/080,063, filed on Mar. 31, 1998.

(51) Int. Cl.$^{7}$ .............................. H02K 1/00; H02K 3/00

(52) U.S. Cl. ................... 310/68 R; 310/68 B; 310/179; 310/180; 310/40 MM; 310/DIG. 6; 318/138; 318/251

(58) Field of Search ............................. 310/68 B, 68 R, 310/40 MM, DIG. 6, 173, 179–180; 318/138, 251; 335/78, 80, 38, 205, 154

(56) References Cited

U.S. PATENT DOCUMENTS 3,626,222 A * 12/1971 Dischler ...................... 310/96
3,900,780 A * 8/1975 Tanikoshi ................... 318/254
4,475,068 A * 10/1984 Brailsford ................... 318/254
5,293,523 A * 3/1994 Posey ......................... 335/205
5,605,614 A * 2/1997 Bornand ....................... 205/50
5,629,918 A * 5/1997 Ho et al. .................... 369/112
6,094,116 A * 7/2000 Tai et al. ....................... 335/78

OTHER PUBLICATIONS

Hiroshi Hosaka, et al.; Electromagnetic Microrelays: Concepts and Fundamental Characteristics; 1993; IEEE.

Joe Drake, et al.; An Electrostatically Actuated Micro–Relay; 1995; Proc. Transducers '95, Stockholm, Sweden, vol. 2, pp. 380–383.

John Wright, et al.; Magnetostatic MEMS Relays for the Miniaturization of Brushless DC Motor Controllers; Jan. 1999; MEMS '99 Conference.

* cited by examiner

*Primary Examiner*—Karl Tamai
*Assistant Examiner*—J. Aguirrechea
(74) *Attorney, Agent, or Firm*—Fish & Richardson P.C.

(57) ABSTRACT

A DC motor is commutated by rotating a magnetic rotor to induce a magnetic field in at least one magnetostatic relay in the motor. Each relay is activated in response to the magnetic field to deliver power to at least one corresponding winding connected to the relay. In some cases, each relay delivers power first through a corresponding primary winding and then through a corresponding secondary winding to a common node. Specific examples include a four-pole, three-phase motor in which each relay is activated four times during one rotation of the magnetic rotor.

14 Claims, 6 Drawing Sheets

USING A MICROMACHINED MAGNETOSTATIC RELAY IN COMMUTATING A DC MOTOR

CROSS REFERENCE TO RELATED APPLICATIONS

This application claims the benefit of U.S. Provisional Application No. 60/080,063, filed on Mar. 31, 1998.

STATEMENT AS TO FEDERALLY SPONSORED RESEARCH

The invention described herein was made in the performance of work under a NASA contract, and is subject to the provisions of Public Law 96-517 (35 USC 202) in which the Contractor has elected to retain title.

TECHNOLOGICAL FIELD

The invention relates to miniaturization of electronic components and, in particular, to using a micromachined magnetostatic relay in commutating a DC motor.

BACKGROUND

Manufacturers and users of electrical and electronic components strive to reduce the size and increase the reliability of these components and the systems in which they are used. Miniaturization of components leads to more compact and lightweight systems, which increases the range of uses for these systems and decreases the costs associated with transporting and using these systems. Improving component reliability lengthens the lifespan and enhances the performance of systems in which the components are used.

Miniaturization and reliability improvements are particularly important in areas such as space exploration and satellite communications. The cost of launching equipment from the Earth's surface is directly related to the size and weight of the equipment, and even modest reductions in equipment size produce large reductions in cost. Likewise, improving the reliability of components used in spaceborne systems extends and improves the performance of these systems, thus reducing the associated costs. In general, each newly developed generation of space oriented components and systems must meet or exceed the performance and cost standards set by previous generations.

One example of commonly used components for which size and reliability are particularly important is DC electric motors. DC motors are used widely as motive devices for linear and rotary drives in spaceborne applications. As gains have been made in the miniaturization of DC motors, the size, weight, and complexity of DC motor systems have become dominated by the commutation and control electronics that drive the motors. The disparity between the size of the motor and the size of its control electronics is particularly noticeable in a highly miniaturized motor, such as a commercially available 3-mm diameter motor, the commutation and control electronics of which are more than ten times larger than the motor itself. Even modest reductions in the power budget, complexity, mass, and volume of components such as these produce tremendous gains in the cost and reliability of spaceborne systems.

SUMMARY

In recognition of the above, the inventors have developed micromachined magnetostatic relays or switches that are highly miniaturized and highly reliable. The switches are made very small using micromachining fabrication techniques, and the materials are carefully selected to provide high reliability. The switches are useful in a wide variety of microelectronic mechanical system (MEMS) applications, particularly in the miniaturization of DC electric motors. For example, in one embodiment of the invention, the switches are used as relays in a MEMS circuit that replaces the conventional commutation and control electronics in a DC motor. This MEMS circuit is much smaller than the DC motor itself, so the size of the motor, not the size of the commutation electronics, is most critical in space constrained applications. The magnetostatic switch requires no biasing current or voltage and is useful in directly switching loads.

In one aspect, the invention features a DC motor having a plurality of windings and at least one magnetostatic relay positioned to activate in the presence of a magnetic field. Each relay is connected electrically to at least one corresponding winding and to power. The motor also includes a magnetic rotor having at least one pole positioned to induce a magnetic field in each magnetostatic relay when passing by the relay.

In some embodiments, the windings are arranged in pairs of primary and secondary windings, and each relay connects to a corresponding one of the pairs of windings. In some cases the secondary windings all connect to a common node, and each of the primary windings connects to the corresponding relay. In one implementation, the motor is a four-pole, three-phase motor that includes three relays separated from each other by approximately 120°.

In another aspect, the invention features a DC motor having a plurality of windings and at least one magnetostatic relay connected electrically to at least one of the windings and to power. Each relay has at least one substrate formed from a non-conductive or semiconductive material, a springing beam formed on the substrate, and two electrically conductive elements, one of which is formed on the springing beam. The electrically conductive-elements together define at least two-switching states, including an open state in which the conductive elements are physically separated from each other, and a closed state in which the conductive elements physically contact each other. The springing beam includes a magnetic material which, in the presence of a magnetic field, creates an actuation force that causes the electrically conductive elements to apply power to or remove power from at least one of the windings by switching from one of the switching states to another of the switching states. The motor also includes a magnetic rotor having at least one pole positioned to induce a magnetic field in each magnetostatic relay when passing by the relay.

In another aspect, the invention features a method for use in commutating a DC motor. The method includes rotating a magnetic rotor to induce a magnetic field in at least one magnetostatic relay in the motor. Each relay is activated in response to the magnetic field to deliver power to at least one winding in the motor.

In some embodiments, each relay first delivers power through a corresponding primary winding and then through a corresponding secondary winding to a common node. Other embodiments include activating each relay four times during one rotation of the magnetic rotor.

Other embodiments and advantages will become apparent from the following description and from the claims.

DETAILED DESCRIPTION

Figure 1A:
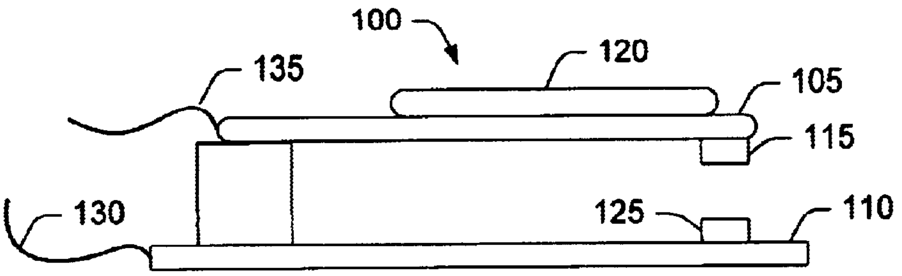
FIGS. 1A and 1B are simplified diagrams of a normally-open magnetostatic switch.
Figure 1B:
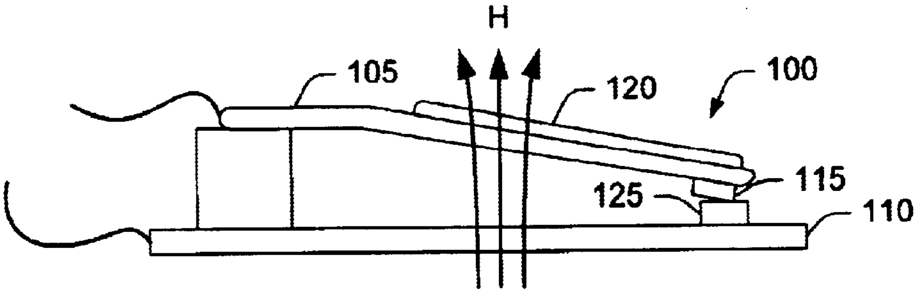

FIGS. 1A and 1B show a normally-open microelectronic mechanical system (MEMS) relay or switch 100. The switch 100 includes a cantilever beam 105 mounted on a substrate 110. For convenience, the substrate 110 is made from a substrate material, such as silicon, that is plentiful and relatively inexpensive. The substrate 110 includes an electrical contact 125 made of an electrically .conductive material, such as gold or silver, with a relatively low contact resistance at modest contact forces. The cantilever beam 105 includes a magnetic actuation plate 120 which, in many embodiments, is made of a soft magnetic material with high permeability, such as permalloy ($Ni_{80}Fe_{20}$). The cantilever beam 105 also includes an electrical contact 115, which may or may not be made of the same material that forms the contact 125 on the substrate 110.

As shown in FIG. 1A, the cantilever beam 105 keeps the electrical contacts 115, 125 separated when the switch 100 is inactive, i.e., when no magnetic field is present. When an external magnetic field H appears, magnetic forces attempt to align the magnetic actuation plate 120 with the magnetic field H, causing the cantilever beam 105 to bend toward the substrate. If the strength of the magnetic field exceeds the design threshold of the switch, the electrical contacts 115, 125 touch, as shown in FIG. 1B, completing an electrical circuit through bond wires 130, 135. The electrical circuit is broken when the magnetic field disappears and the restoring force of the cantilever beam 105 separates the electrical contacts 115, 125. In alternative implementations, the cantilever beam 105 is designed to separate the contacts 115, 125 when the direction or the magnitude of the magnetic field changes.

Figure 2A:
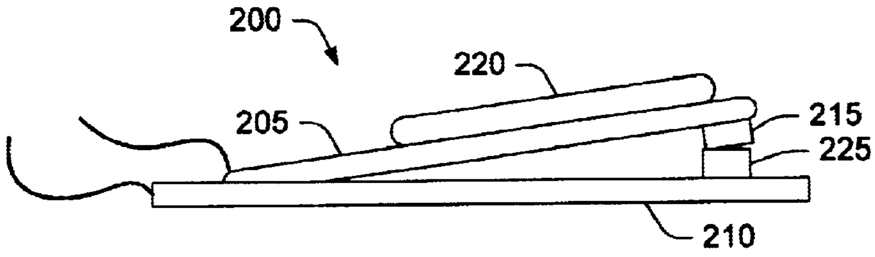
FIGS. 2A and 2B are simplified diagrams of a normally-closed magnetostatic switch.
Figure 2B:
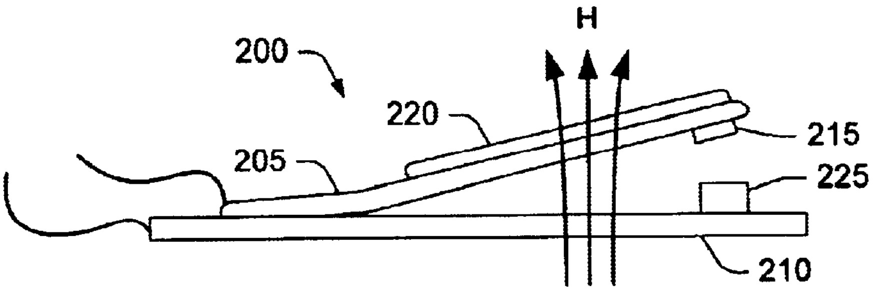

FIGS. 2A and 2B show a normally-closed MEMS switch 200 of similar structure. The cantilever beam 205 in this switch is mounted on the substrate 210 so that the electrical contacts 215, 225 of the beam 205 and the substrate 210 are held together when the switch 200 is inactive. Applying a magnetic field to the magnetic actuator plate 220 causes the beam 205 to bend away from the substrate 210, thus separating the contacts 215, 225. The contacts 215, 225 come together again when the magnetic field disappears or, alternatively, when the direction or the magnitude of the magnetic field changes.

An alternative design for the normally closed switch resembles the normally open switch of FIG. 1A, except that the cantilever beam 105 is formed such that residual stress imparts ID curvature to the beam 105, holding the tip of the beam 105 against the lower electrical contact 125. In this embodiment, subjecting the beam 105 to a magnetic field creates a 105 force that opposes the residual stress in the beam 105, pulling the contacts 115, 125 apart.

Several design parameters are considered when designing micromachined magnetostatic switches like these. For a normally-open switch, these parameters include load voltage, maximum current through the switch, operating force (i.e., the force between the contacts when the switch is closed), contact closing time, and lifetime operations. Table I below shows typical values for these parameters in three types of switches: conventional electrostatic microswitches, conventional electromagnetic microswitches, and the micromachined magnetostatic switch described here. This table shows, among other things, that the micromachined magnetostatic switch produces much larger contact forces than the conventional microswitches produce, which reduces contact resistance and thus supports much larger operating currents.

TABLE I

| Parameter | Unit | Electrostatic Microswitch | Electromagnetic Microswitch | Micromachined Magnetostatic Switch |
|---|---|---|---|---|
| load voltage | volts | 20 | 20 | 36 |
| maximum current | mA | 0.1 | 100 | >500 |
| operating force | mN | 0.001 | 0.1 | >1 |
| contact gap | μm | 2 | >5 | >5 |
| contact closing time | μsec | 20 | 200 | <100 |
| lifetime operations | cycle | >10 million | N/A | >100 million |

In most situations, the micromachined magnetostatic switches and the systems in which they are used are designed to produce large actuation forces, which leads to several additional benefits. Larger actuation forces are present allow a stiffer s cantilever beam, which leads to shorter switching time, higher g-force tolerance, and greater contact breaking force. Greater contact breaking force in turns leads to increased switching lifetime. Large actuation forces also provide the large contact forces, typically between 100 μN and 1 mN, required to yield an acceptable contact resistance when common contact materials, such as silver and gold, are used. The presence of large actuation forces also allows the switches to be designed with large gap distances between contacts, which increases device breakdown voltage.

The force generated at the free end of the cantilever beam is represented by the equation:

$$F_{bending}=M_s(WT)H\cos\theta,$$

where T=the thickness of the magnetic actuation plate 120, W=the width of the plate 120, L=the length of the plate 120, θ=the deflection angle of the beam 105 (θ=0 when the switch is inactive), H=the magnitude of the external magnetic field, and $M_s$=the saturation magnetization of the magnetic material. This equation shows that the bending force is greatest when the values of $M_s$, W, T, and H are large and the deflection angle (θ) is small. In a DC motor, the magnitude of magnetic field (H) is determined by the motor itself, and the deflection angle is determined by the desired gap distance between the contacts in the switch. In most embodiments, the gap distance between contacts and the rotation of the beam are very small, so θ≈0.

A soft magnetic material such as permalloy has a high saturation magnetization ($M_s$ greater than 0.8 Tesla), has thick plating capability, and automatically magnetizes with the desired magnetization orientation when actuated. Therefore, materials such as permalloy can be advantageous for constructing the magnetic actuation plate. Forces in excess of 5 mN are easily obtained with a permalloy actuation plate having a width of 3 mm and a thickness of 10 μm in a DC motor that produces a magnetic field strength of approximately 2500 gauss.

Figure 3A:
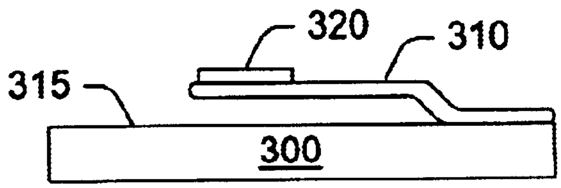
FIGS. 3A, 3B, and 3C are diagrams illustrating, in cross-section, the fabrication of a magnetostatic switch micromachined from two substrates.
Figure 3B:
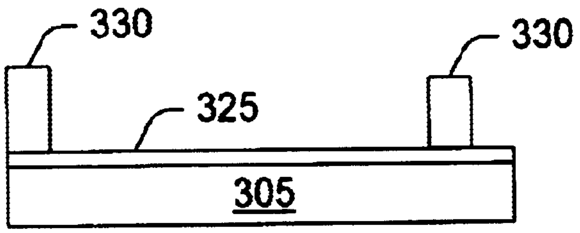
Figure 3C:
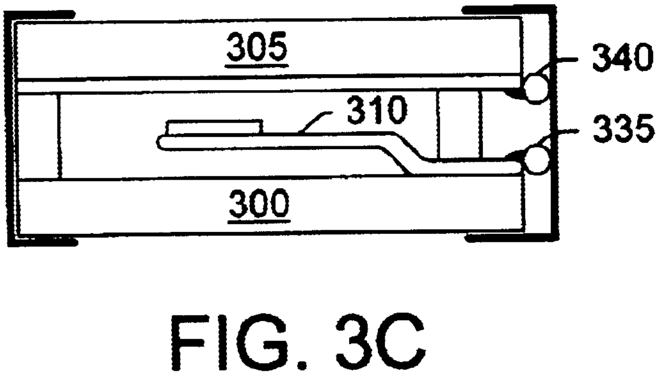

FIGS. 3A, 3B, and 3C show a magnetostatic switch micromachined from two rigid substrates 306, 305, each of which is made from a material such as silicon. The first substrate 300 (FIG. 3A) includes a magnetic actuation plate 310 formed on a surface 315 of the substrate 300. The size of the plate 310 and the materials used to form the plate 310 are determined by the factors discussed above. The plate 310 is formed over a sacrificial spacing layer (not shown here) that is deposited on a portion of the surface 315 of the substrate 300, as discussed in more detail below. After the spacing layer is removed, the plate 310 forms a cantilevered beam, a portion of which contacts the substrate 300, and the rest of which is separated from the substrate 300 by the void left by the spacing layer. An optional contact layer 320 appears on the cantilever portion of the plate 310.

The second substrate 305 (FIG. 3B) includes a contact layer 325. A permanent spacing layer 330 is deposited and patterned over a portion of the contact layer 325. Alternatively, the spacing layer 330 is formed directly on the substrate 300. The height of this spacing layer 330 is determined by the desired gap distance between the contact layers 320, 325. As shown in FIG. 3C, the substrates 300, 305 are bonded or clipped together to form a switch. One or more bond wires 335, 340 are connected to the magnetic actuation plate 310 on the first substrate 300 and to the contact layer 325 on the second substrate 305.

Figure 4A:
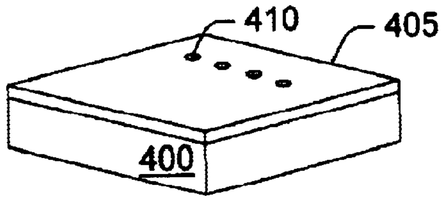
FIGS. 4A, 4B, 4C, 4D, and 4E are perspective views of a substrate at several steps of a two-substrate switch fabrication process.

FIGS. 4A through 4E show one technique for creating the magnetic actuation plate on a substrate 400. First, a sacrificial spacing layer 405 is deposited onto the substrate 400 (FIG. 4A). The spacing layer 405 is formed from an etchable material, such as photoresist. In highly miniaturized switches, the spacing layer 405 typically has a thickness of between 2 μm and 20 μm. The spacing layer 405 is patterned to form anchor holes 410, which allow the magnetic material forming the actuation plate to bond with the substrate 400 as described below. In many switches, a very thin electroplating seed layer is deposited over the spacing layer to facilitate formation of the magnetic actuation plate.

Figure 4B:
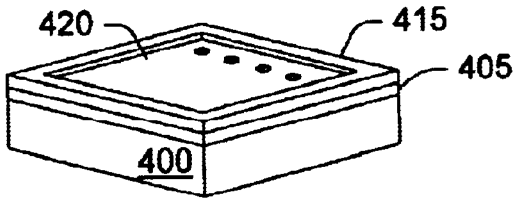
Figure 4C:
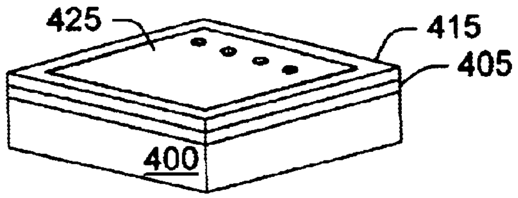

A photoresist plating mold layer 415 then is deposited over the spacing layer 405 and patterned to form a mold cavity 420 (FIG. 4B). The mold cavity 420 exposes most of the spacing layer 405, including the anchor holes 410. A magnetic material 425, such as permalloy, is deposited onto the spacing layer 405, filling the mold cavity 420 (FIG. 4C). The magnetic material 425 also fills the anchor holes 410 in the spacing layer 405, forming anchors (discussed below) that contact the substrate 400 directly. The magnetic material 425 is deposited to a thickness of between 10 μm and 20 μm in many highly miniaturized switches.

Figure 4D:
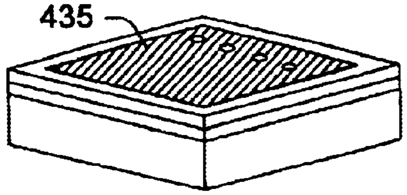
Figure 4E:
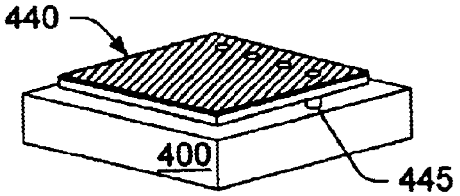

A layer of contact material 435 then is deposited over the layer of magnetic material 425 (FIG. 4D). The contact material 435 is selected from a wide range of materials with good electrical contact properties, including evaporated metals such as gold and silver. A typical thickness for the contact layer 435 is between 0.1 μm and 10 μm.

An etchant then is used to remove the photoresist mold layer 415 and spacing layer 405 from the substrate 400, leaving a magnetic actuation plate 440 mounted to the substrate 400 by anchors 445. The magnetic actuation plate 440, which includes the layers of magnetic material 425 and contact material 435, is spaced above the substrate 400 by the thickness of the stripped spacing layer 405.

Fabrication of the second substrate is carried out as shown in FIG. 3B. A layer of contact material is deposited onto a rigid substrate. A permanent spacing layer then is deposited over the contact material and patterned to avoid inhibiting the operation of the magnetic actuation plate. A wide variety of materials, such as photoresist, glass, plated metals, and plastic, are used to form the permanent spacing layer. A typical thickness for this layer is between 10 μm and 200 μm, depending on the desired operating characteristics of the switch. The two substrates then are bonded together to form an operational switch.

Figure 5A:
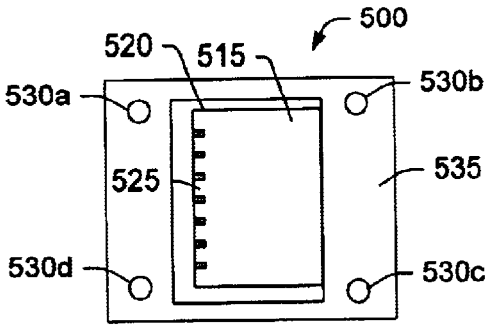
FIGS. 5A, 5B, and 5C are plan views of substrates in a three-substrate switch fabrication process.

In other embodiments, the magnetic material is deposited is onto a cantilevered beam formed in the silicon substrate. One fabrication technique uses an anisotropic silicon etchant to produce a cavity in a silicon substrate frame. Etching stops just short of the opposing surface of the substrate, creating a thin silicon membrane at the bottom of the cavity. A photoresist layer then is deposited onto the membrane and patterned to form the shape of the cantilevered beam. The substrate undergoes an etching process, such as reactive ion etching (RIE), to remove all exposed portions of the membrane, leaving only a cantilevered beam connected to the substrate frame, similar to that shown in FIG. 5A and discussed below. In some cases, the cantilever beam is formed into complex shapes. For example, in one implementation the plate is attached to the substrate via torsional beams. In another implementation, one end of the plate is shaped into multiple independent fingers, as shown in FIG. 5A. The magnetic material is deposited onto the cantilevered beam using standard techniques, such as permalloy electroplating. This process allows single crystal silicon to serve as the mechanical spring material. Single crystal silicon has strength properties similar to steel without the plastic deformation limitations.

Figure 5B:
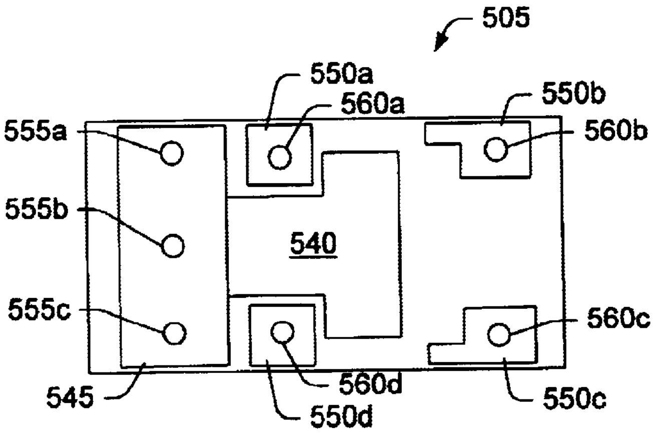
Figure 5C:
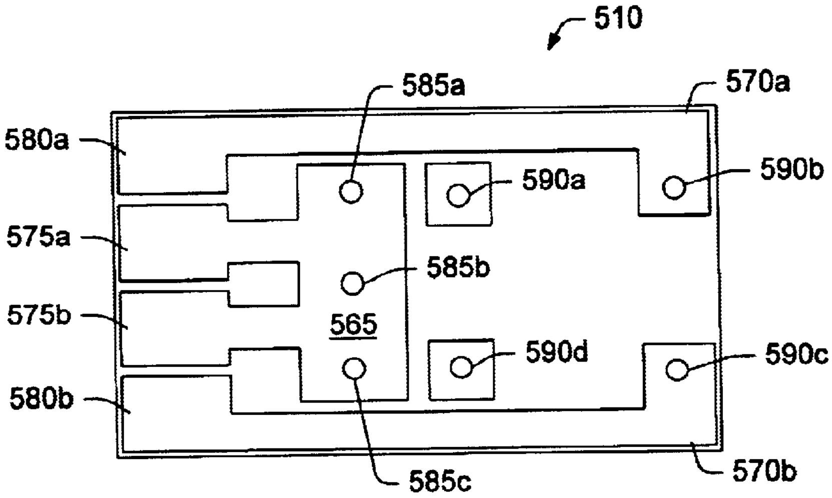

FIGS. 5A through 5C show the components of a switch fabricated from three substrates. The first substrate 500 (FIG. 5A) includes the magnetic actuation plate 515, which is formed on the surface of or as a cantilevered beam 520 in the substrate 500. Electrical contacts 525 are molded at the free end of the cantilevered beam 520. At least a portion of the substrate 500 includes a conductive layer 535 that allows electrical connection between the contact points at the end of the magnetic actuation plate 515 and at least a portion of the surrounding frame. In many switches, this conductive layer 535 is the magnetic plate itself. Alternatively, the conductive layer 535 is formed by depositing an electrical contact material, such as silver or gold, over the surface of the substrate 500. Holes or recesses 530*a–d* are formed in the substrate 500, including in the conductive area 535, to allow alignment and, in some cases, electrical contact with the other substrates.

The second substrate 505 (FIG. 5B) includes a conductive contact plate 540 that connects electrically to the magnetic actuation plate 515 only when the switch is active. The contact plate 540 often is formed from the same material as the electrical contacts 525 on the magnetic actuation plate 515, but other contact materials also are used. The second substrate 505 also includes spacers 545, 550*a–d* that provide the required physical separation between the magnetic actuation plate 515 and the contact plate 540. The spacers 545, 550*a–d* can be formed in place from nearly any material, either conductive or insulative. The spacers may also be placed manually, if desired. One approach uses a low-resistance conductive material, such as copper, that is electrodeposited onto the surface of the substrate 505 through a mold. In this implementation, at least one spacer 545 connects electrically to the contact plate 540. The remaining spacers 550*a–d* may or may not connect electrically to the magnetic actuation plate 515. Each spacer 545 that connects to the contact plate 540 is isolated electrically from the spacers that connect to the magnetic actuation plate 515. Holes 555*a–c*, 560*a–d* in the spacers allow alignment and, in some cases, electrical connectivity with the other substrates.

The third substrate 510 (FIG. 5C) serves as an output and protective layer for the switch. This substrate 510 includes two conductive areas 565, 570*a–b* that are electrically isolated from each other. One of these areas 570*a–b* connects electrically to the magnetic actuation plate 515. The other area 565 connects to the spacer 545, which is connected to the contact plate 540. The two areas 565, 570*a–b* connect electrically to each other only when the switch is active, i.e., only when the magnetic actuation plate 515 and the contact plate 540 are in contact. The conductive areas 565, 570*a–b* terminate in conductive pads 575*a–b*, 580*a–b* that allow the switch to connect to outside circuitry.

Several alignment pegs 585*a–c*, 590*a–d* extend from the conductive areas 565, 570*a–b* on this substrate 505. These pegs allow alignment with the other substrates and, in some cases, are electrically conductive to ensure electrical connectivity with the other substrates. The first substrate 500 rests directly on the third substrate, with four of the pegs 590*a–d* protruding through the holes 530*a–d* in the first substrate 500. In some cases, the pegs bond to the conductive surface 535 of the substrate 500 through a conductive bonding material, such as solder, thus connecting the magnetic actuation plate 515 to the corresponding conductive area 570*a–b* of the third substrate 510. In other applications, an insulative adhesive, such as epoxy, is used.

The second substrate 505 sits directly over the first substrate 500. One set of pegs 585*a–c* protrudes into the holes 555*a–c* in the spacer 545 that connects to the contact plate 540, thus bonding the contact plate 540 to the corresponding conductive area 565 on the third substrate 510. The other set of pegs 590*a–d* protrudes into the holes 560*a–d* in the other spacers 550*a–d*. The pegs and the spacers usually are bonded using a conductive bonding material, such as solder. The first substrate 500 and the second substrate 505 are oriented so that the magnetic actuation plate 515 touches the contact plate 540 when the switch is active.

Figure 6:
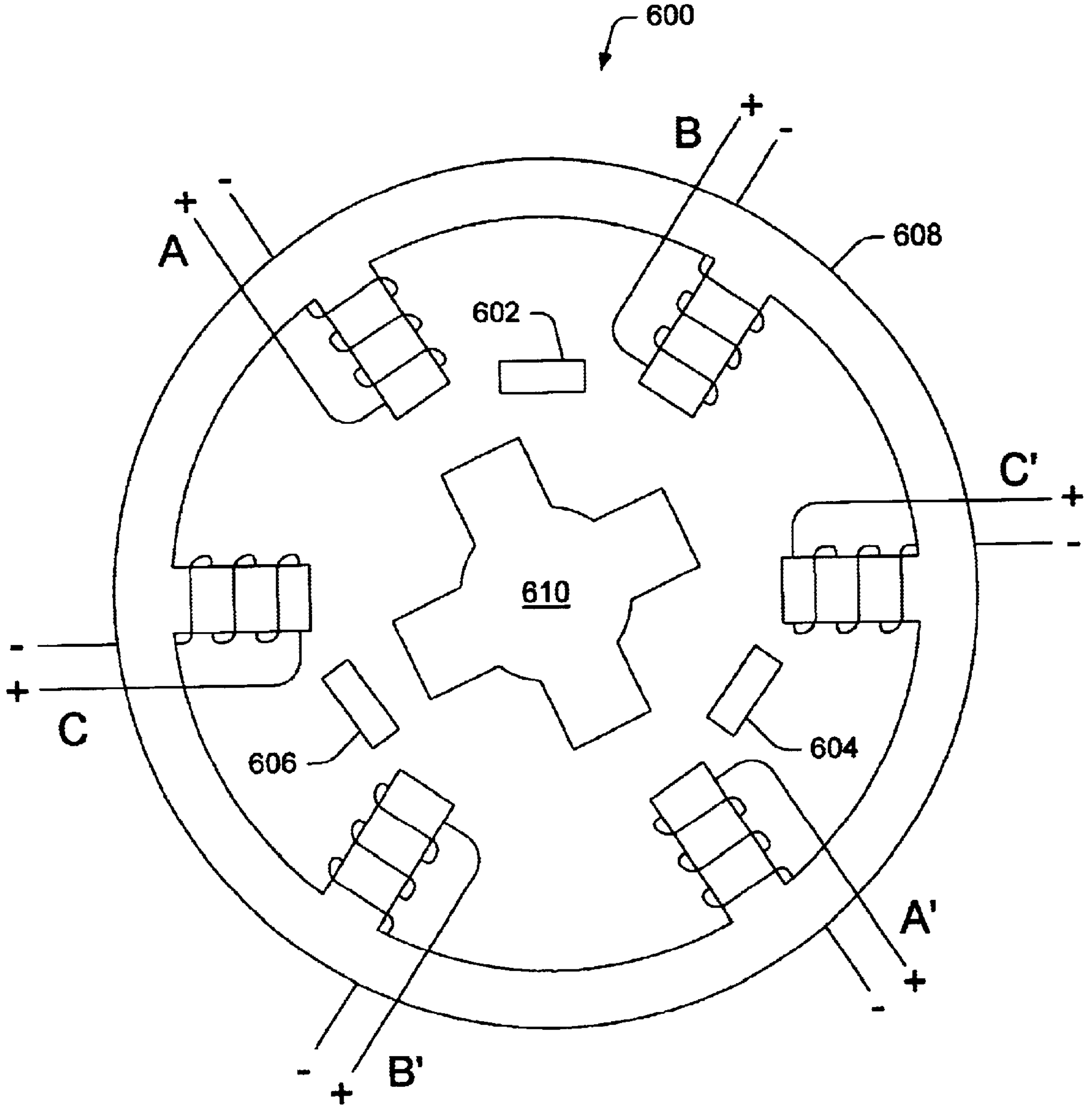
FIG. 6 is a plan view of a DC motor having a MEMS commutation circuit that uses micromachined magnetostatic switches.

FIG. 6 shows a DC motor 600 having a commutation circuit that includes micromachined magnetostatic relays 602, 604, 606 like those described above. In this example, the motor 600 is a four-pole, three-phase brushless motor having three pairs of primary and secondary windings A–A', B–B', C–C'. The windings in each pair are positioned on opposite sides of the motor housing 608 and are separated by a magnetic rotor having four poles. The relays 602, 604, 606 here are shown in relative positions in which they are spaced by angles of 120° and are placed in close proximity to stator poles. Absolute positioning of the relays 602, 604, 606, and even the number of relays, depends on the particular motor and wiring implementation with which they are used. More complex commutation techniques involving micromachined relays include H-bridge circuits, zener diode shunts, and other electronics. The particular commutation circuit used depends on the desired performance and lifetime characteristics for the motor in a particular application.

Figure 7:
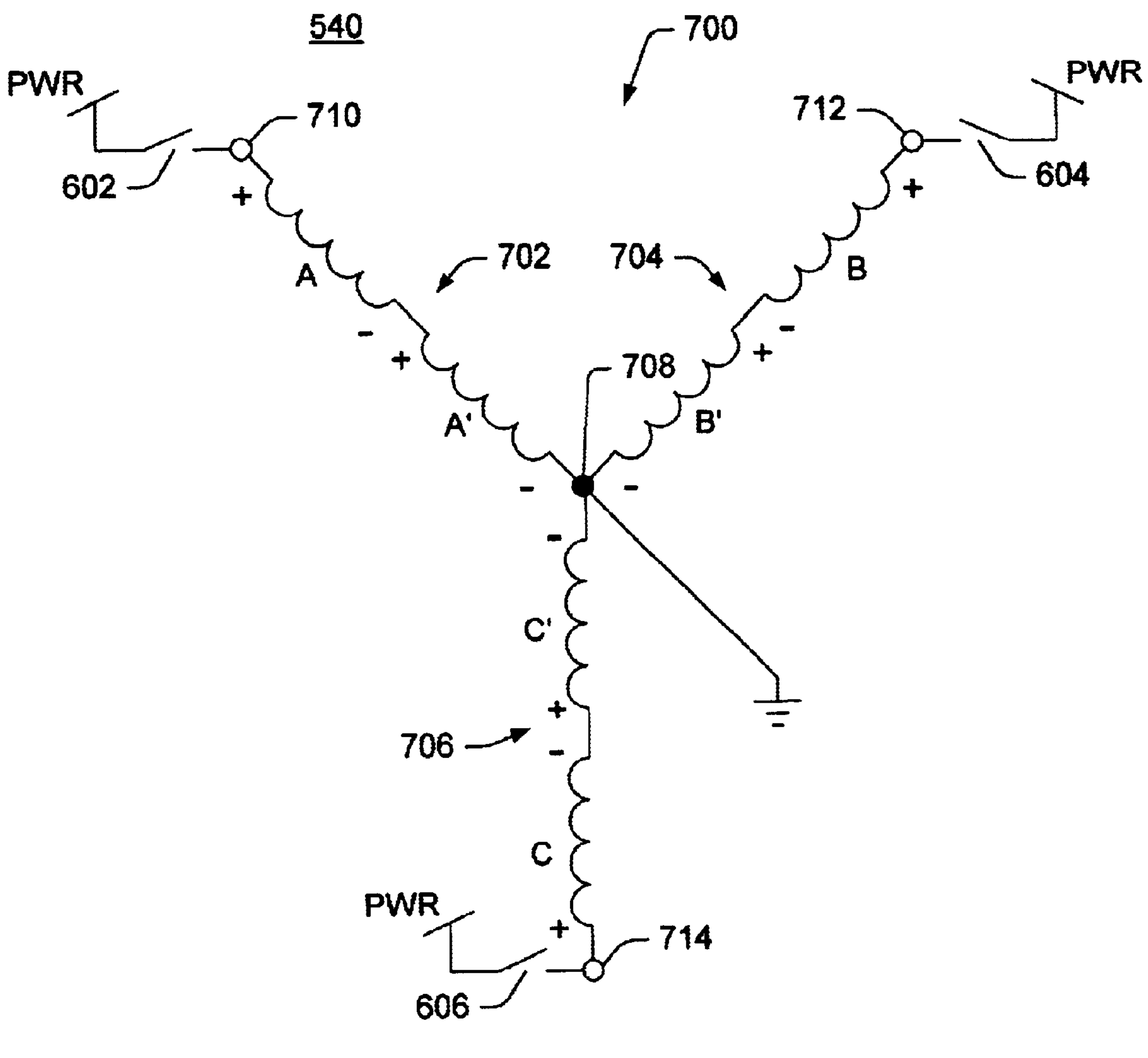
FIG. 7 is a schematic diagram of the motor windings for the DC motor of FIG. 6.

FIG. 7 is a schematic diagram showing the windings of the DC motor of FIG. 6 wired into a common "Y" or "star" configuration. The circuit 700 includes three branches 702, 704, 706 extending from a common node 708. Each of the branches includes one of the pairs of primary and secondary windings A–A', B–B', C–C', connected in series between the common node 708 and one of three power nodes 710, 712, 714. The common node 708 connects to ground. Each of the power nodes 710, 712, 714 connects to a power supply line (PWR) through one of the magnetostatic relays 602, 604, 606. The magnetostatic relays 602, 604, 606 close, and therefore apply power to the corresponding branches 702, 704, 706 of the circuit 700, each time the magnetic rotor 610 induces a magnetic field in the relays.

Other embodiments are within the scope of the following claims. For example, some embodiments of the micromachined magnetostatic switch are produced using a single-substrate fabrication technique, instead of the two-substrate and three-substrate techniques described above. Also, in many applications the switch is formed from magnetic and electrically conductive materials having properties different than the properties of those materials described above. For example, magnetic materials other than permalloy are used in applications requiring higher or lower values for the saturation magnetization of the material. Also, the magnetic material itself may be used instead of a traditional contact material to form the electrical contact when the switch is closed. In some embodiments, a springing element such as a torsional beam or a helical spring is used instead of or in addition to the cantilever beam.

The micromachined magnetostatic switch is suitable for a wide range of applications other than commutation of DC motors, including virtually any application for which traditional relays and switches are used. Examples include telecommunication switching, household electronics and appliances, computers, and handheld electronics. The magnetostatic switch also is useful as a magnetic field sensor. An array of these switches designed to respond to magnetic fields of varying strengths provides very sensitive magnetic field measurements. As a result, these switches also are useful in applications previously reserved for traditional magnetic devices, such as Hall Effect sensors. The switches are useful as rotational and linear encoders, as well as in applications previously requiring reed relays.

What is claimed is:

1. A DC motor comprising:

a plurality of windings;

at least one microelectronic mechanical system (MEMS) relay positioned in the motor to activate in the presence of a magnetic field, where each relay includes:

a first substrate formed from a nonconductive or semiconductive material;

a magnetic actuation plate micro-machined on said first substrate, said magnetic actuation plate having a first conductive surface, said magnetic actuation plate comprising one or more anchors in direct contact with the first substrate, where said magnetic actuation plate and said one or more anchors are formed of permalloy material; and a second substrate provided adjacent to said magnetic actuation plate, said second substrate having a nonconductive surface and a second conductive surface, where said first and second conductive surfaces define at least two switching states, including an open state in which the conductive surfaces are physically separated from each other, and a closed state in which the conductive surfaces physically contact each other, where said magnetic actuation plate, in the presence of a magnetic field, creates an actuation force that causes the electrically conductive surfaces to switch from one of the switching states to another of the switching states, and where each relay is connected electrically to at least one corresponding winding and to power; and a magnetic rotor having at least one pole positioned to induce a magnetic field in each MEMS relay when passing by the relay.

2. The motor of claim 1, wherein the windings are arranged in pairs of primary and secondary windings and each relay connects to a corresponding one of the pairs of windings.

3. The motor of claim 2, wherein the secondary windings all connect to a common node and each of the primary windings connects to the corresponding relay.

4. The motor of claim 1, wherein the motor is a four-pole, three-phase motor.

5. The motor of claim 4, wherein the motor includes three relays separated from each other by approximately 120°.

6. The motor of claim 1, wherein the relay is magnetically switched between the first and the second switching states without an electrical biasing current or voltage.

7. A spaceborne system, the spaceborne system comprising a DC motor micromachined mechanical system (MEMs) commutation circuit, the DC motor micromachined mechanical system (MEMs) commutation circuit comprises:

a plurality of windings wired into a star configuration;

a plurality of micromachined mechanical system switches each electrically connected to one part of said windings, wherein each switch is magnetically switched by a magnetic field without an electrical biasing current or biasing voltage to turn electrical power on or off in at least one of the windings; and a rotating magnetic rotor having at least one pole to direct the magnetic field in at least one of the switches when passing by the switch.

8. The DC motor micromachined mechanical system (MEMs) commutation circuit as in claim 7, wherein said switch comprises a micromachined magnetostatic switch.

9. The spaceborne system as in claim 7, wherein the number of switches corresponds to the number of motor phases.

10. The spaceborne system as in claim 7, wherein said switch is a relay, wherein the relay comprises:

a first and second conductive surface to define at least two switching states, including an open state in which the conductive surfaces are physically separated from each other, and a closed state in which the conductive surfaces physically contact each other to permit a current flow between the two conductive surfaces.

11. A DC motor for spaceborne applications comprising a commutation circuit, the communication circuit comprising:

a plurality of windings, wherein the plurality of windings comprise three pairs of primary and secondary windings wired into a star configuration;

a micromachined mechanical system (MEMs) relay electrically connected to one part of said windings for a motor phase, wherein the relay is actuated in response to a magnetic field and operates without biasing current or biasing voltage, wherein the relay comprises a first and second conductive surface to define at least two switching states, including an open state in which the conductive surfaces are physically separated from each other, and a closed state in which the conductive surfaces physically contact each other to permit a current flow between the two conductive surfaces; and a rotating magnetic rotor having at least one pole positioned to direct the magnetic field in the relay when passing by the relay.

12. The DC motor as in claim 11, wherein the number of switches corresponds to the number of motor phases.

13. A method for applying power to a DC motor in spaceborne applications, the method comprising:

actuating a micromachined mechanical system (MEMs) relay in a magnetic field, wherein a rotating magnetic rotor induces the magnetic field, wherein the relay is magnetically actuated without an electrical biasing current or voltage; and closing the micromachined mechanical system (MEMs) relay to conduct current through a DC motor commutation circuit, wherein the DC motor commutation circuit comprises:

a power source, three pairs of primary and secondary windings, three micromachined mechanical system (MEMs) relays, and a ground terminal.

14. A method for removing power from a DC motor in spaceborne applications, the method comprising:

opening a micromachined mechanical system (MEMs) relay when a magnetic field is removed from the micromachined mechanical system (MEMs) relay; and terminating current conduction through a DC motor commutation circuit when the micromachined mechanical system (MEMs) relay opens, wherein the DC motor commutation circuit comprises:

a power source, a plurality of windings wired into a star configuration, one semiconductor device, and a ground terminal, wherein the one semiconductor device is a micromachined mechanical system (MEMs) relay.

* * * * *